United States Patent [19]

Strange

[11] 4,078,223
[45] Mar. 7, 1978

[54] GEOPHONE AND SEISMIC CABLE ASSEMBLY
[75] Inventor: Booth B. Strange, Houston, Tex.
[73] Assignee: Western Geophysical Co. of America, Houston, Tex.
[21] Appl. No.: 722,860
[22] Filed: Sep. 10, 1976
[51] Int. Cl.² .............................................. G01V 1/16
[52] U.S. Cl. ................................ 340/7 R; 340/17 R; 181/112
[58] Field of Search ............ 340/7 R, 17 R, 15.5 MC, 340/15.5 TN, 3 T; 181/112; 337/21

[56] References Cited
U.S. PATENT DOCUMENTS

| 1,481,923 | 1/1924 | Nash | 340/3 T |
|---|---|---|---|
| 3,691,518 | 9/1972 | Schuster | 340/15.5 TN |
| 3,825,886 | 7/1974 | Thigpen | 340/7 R |
| 3,887,897 | 6/1975 | Neitzel et al. | 340/7 R |
| 3,921,755 | 11/1975 | Thigpen | 340/7 R |

Primary Examiner—Manyard R. Wilbur
Assistant Examiner—Lawrence Goodwin
Attorney, Agent, or Firm—William A. Knox

[57] ABSTRACT

Sets of at least three geophones are oriented in different directions perpendicular to the longitudinal axis of a seismic cable in which they are assembled, so that at least one geophone in each set will detect substantially vertically-propagating reflected seismic signals when the cable is rotated in any orientation about its longitudinal axis. Arrangements may be provided to selectively enable the one geophone of each set that has its axis most nearly oriented to the vertical.

8 Claims, 5 Drawing Figures

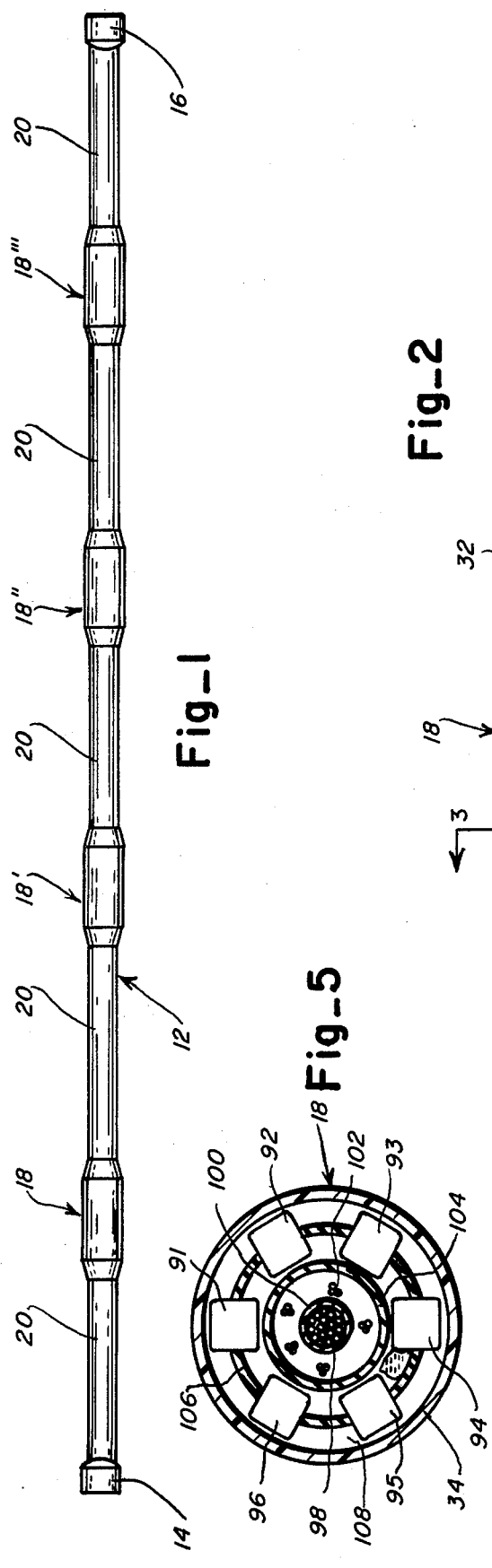
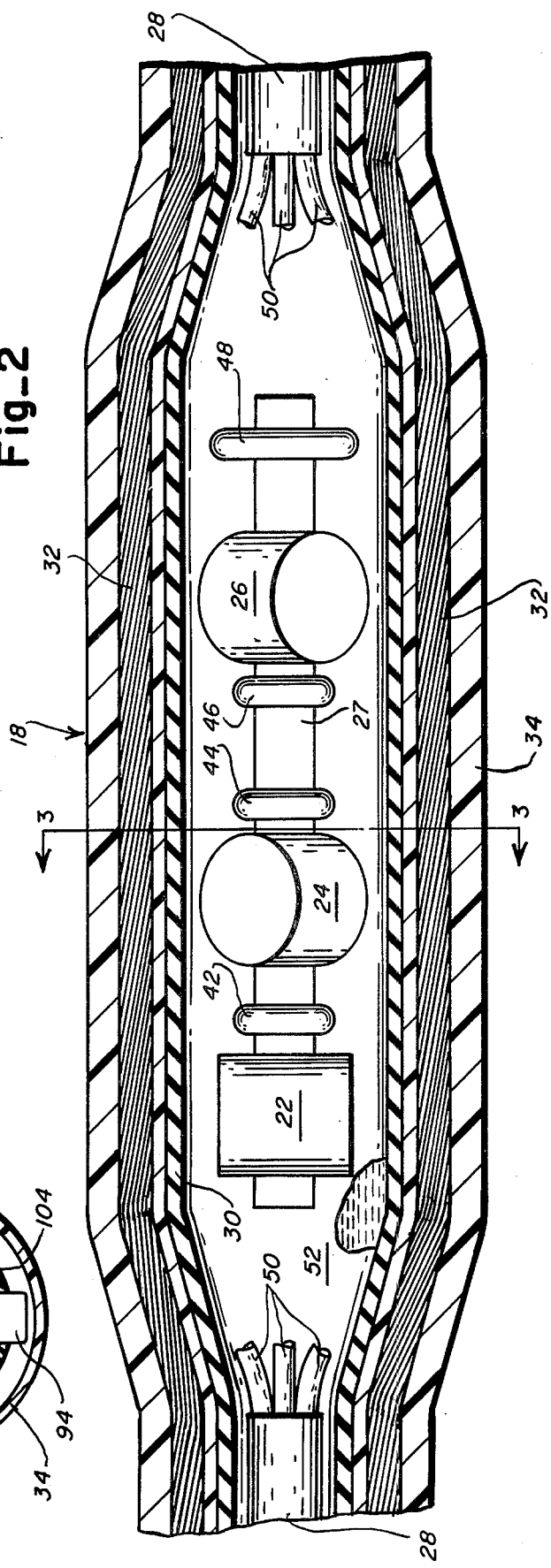

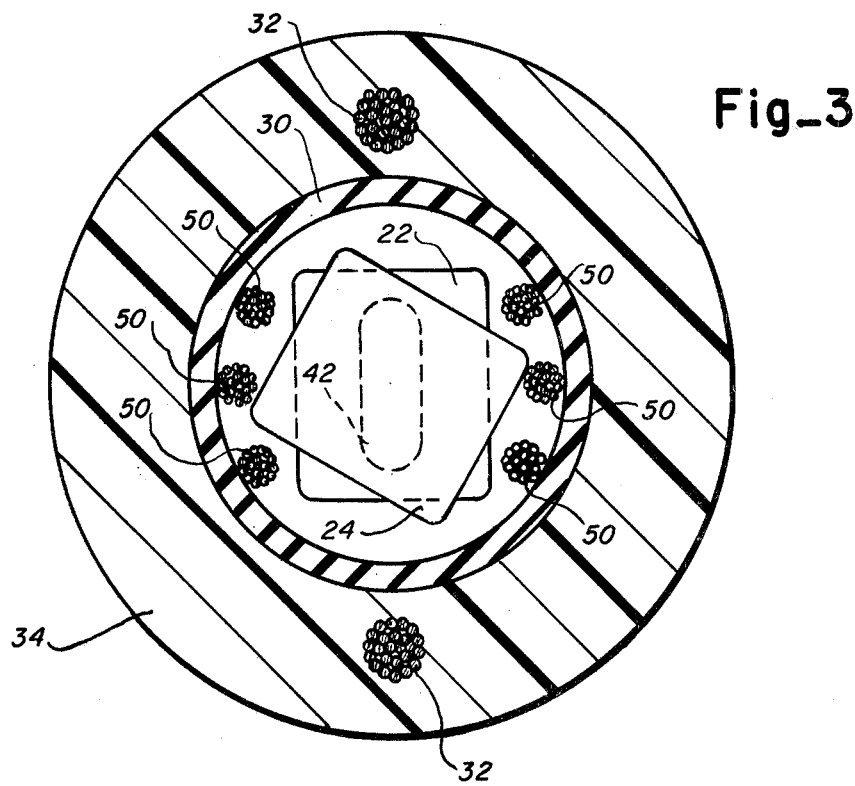
Fig_3
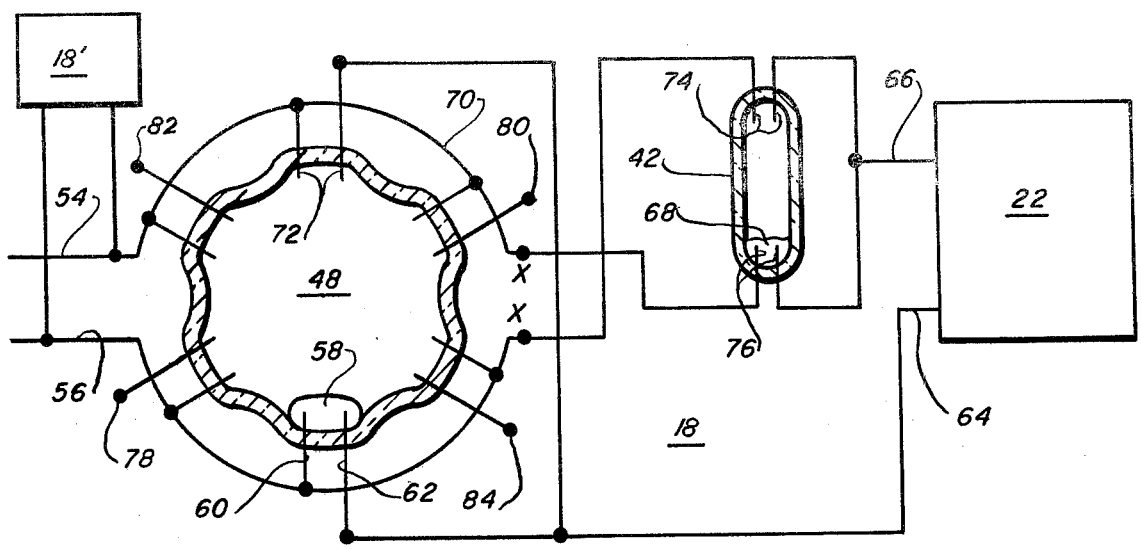
Fig_4

GEOPHONE AND SEISMIC CABLE ASSEMBLY

FIELD OF THE INVENTION

This invention relates to seismic cable systems having geophone assemblies integrally mounted on the cable.

BACKGROUND OF THE INVENTION

For seismic surveys on land, geophones are usually hand "planted" or placed individually on the ground and are connected by clip leads or plugs, to a long multiconductor seismic cable. The number of geophones used per survey station may total eight hundred to two thousand such instruments. Geophones are constructed to be responsive to vertically-travelling compressional seismic waves, but are generally insensitive to seismic waves travelling at right angles to the vertical axis of the geophone. Typically a geophone has one direction of maximum sensitivity. That direction is designed to be vertical. The sensitivity falls off at increasing angles from the direction of maximum sensitivity. If the axis of the geophone is tilted substantially away from the vertical, the output signals from the geophone are attenuated or distorted.

In shallow-water environments such as lakes, swamps, rivers, and bays, it is not practical to plant geophones on the bottom beneath the water. Accordingly, hydrophones are substituted for geophones. Since hydrophones respond to pressure waves rather than to vertically-travelling compressional waves, hydrophones have no preferred orientation. Instead of hand-planting the orientation-insensitive hydrophones, they are permanently secured to the seismic cable. The entire cable, including hydrophones, is then dragged from station to station. Twisting of the cable and random hydrophone orientation are of no consequence.

In the conduct of a line of survey that includes alternately both dry and submerged landforms, geophones are customarily used on dry land. Over water covered areas, a hydrophone "drag cable" is substitued for the land cable and geophones. This causes problems, as it is most undesirable to substitute a pressure-sensitive detector for a motion-sensitive detector. Corresponding signals from each of the two types of detectors are out of phase with each other and are difficult, if not impossible, to correlate, one with the other. Because of this fact, it is preferred to use the same type of detector for the entire survey. Furthermore, the sensitivity of hydrophones in very shallow water is inferior to that of a geophone under the same conditions.

Employing marine survey techniques, it would be useful to permanently secure geophones to the seismic cable. Not only would this practice eliminate the need for hand-planting a thousand or more geophones at each station, it would also be possible to use the same detector for both land and shallow marine operations. The problem of a geophone being sensitive principally to seismic waves received along its axis has, up to the present time, prevented the widespread use of geophones integrally mounted in seismic cables.

Two principal alternatives have been proposed heretofore to solve the foregoing problem. In accordance with one of these alternatives, geophones have been secured to a relatively flat belt, as shown in U.S. Pat. No. 3,825,866 for example, and the orientation of the flat belt is maintained as it is dragged along the ground or in shallow water by the flat geometry of the belt. Another well-known alternative involves the use of gimbal-mounted geophones, in which vertical orientation of the geophones is obtained by mounting them pendulously for free orientation under the force of gravity.

Neither of the foregoing two alternatives is as satisfactory as would be desirable, as the flat belts are unduly heavy, bulky, and awkward; and the mechanical complexity of the gimbal mountings as well as the fact that the geophone is coupled to the ground through the gimbal mountings with consequent signal distortion, makes them expensive and subject to mechanical failure in the field and inferior in the quality of seismic signal output.

Accordingly, an important object of the present invention is to provide an improved cable-mounted geophone arrangement.

SUMMARY OF THE INVENTION

The present invention contemplates the provision of sets of geophones secured at given intervals along the length of a seismic cable, with the geophones included in each set, having their directions of maximum sensitivity perpendicular to, and at different angular orientations about, the longitudinal axis of the cable.

As a subordinate feature of the invention, those geophones which are not vertically oriented, or nearly so, may be disabled, or rendered insensitive, so that undesired noise and signal distortion will not be detected by the system. The disabling function may be accomplished by gravity operated switches, such as mercury switches, or by suitable mechanical arrangements, for example.

The system of the present invention has the advantage of reliability and simple mechanical construction and geometry, and has improved sensitivity in shallow water as compared with marine cables using hydrophones.

Other objects, features and advantages of the invention will become apparent from a consideration of the following detailed description and the accompanying drawings, in which:

FIG. 1 is a schematic showing of a seismic cable section;

FIG. 2 is a cross-sectional view of a geophone assembly illustrating the principles of the invention;

FIG. 3 is a cross-sectional view taken along lines 3—3 of FIG. 2;

FIG. 4 is a circuit diagram showing the electrical interconnections of the geophones and gravity switches of FIGS. 2 and 3; and FIG. 5 shows an alternative embodiment of the invention;

Referring more particularly to the drawings, FIG. 1 is a schematic showing of a seismic cable section 12. In accordance with the customary practice in seismic cables, the cable section 12 may be approximately 200 feet long and may be provided with plugs 14 and 16 at its two ends for interconnection with other seismic cable sections. In practice, a seismic cable may be up to two miles or more in length and may thus include a large number of 200 foot sections such as that shown in FIG. 1.

In FIG. 1 the cable section 13 includes four sensor assemblies 18, 18', 18" and 18'" although more or fewer may be used. In the embodiment of the invention which will be illustrated in connection with the FIGS. 2 through 4 of the drawings, each of the sensor assemblies 18 includes three geophones. Plugs 14, 16 and the sensor units 18 are interconnected by normal sections of multiconductor cable 20 which contain a substantial number of cable pairs sufficient to transmit the seismic signals originating from various sensor units 18 to a multichannel recorder which is normally located at one end of the long composite seismic cable.

FIG. 2 shows one of the sensor units 18 of FIG. 1 and the three geophones 22, 24 and 26 which are oriented perpendicular to, and at sixty-degree intervals around, the longitudinal axis of each sensor unit 18.

The details of the internal structure of a geophone are well-known and will not be elaborated here. A typical basic moving coil geophone arrangement is shown in a text entitled MECHANICAL VIBRATIONS, by J. P. Den Hartog, McGraw-Hill Book Company, New York, New York, 1947, in which particularly note FIG. 49A on page 81. A typical commercially available geophone may be approximately 1 inch high and ⅝ inch in diameter. Suitable units may be obtained from Geospace Corporation, 5803 Glenmont Drive, Houston, Texas 77036. A geophone having the above dimensions is described in Geospace Product Bulletin 715-R, and is disclosed in U.S. Pat. No. 3,119,978. A geophone normally has a moving coil mounted on a bobbin that is spring-suspended in a magnetic field in a manner similar to that employed in some loud speaker assemblies. Geophones of this type are normally sensitive to vibrations or seismic impulses having a component directed along the central axis of the coil which normally coincides with the central axis of a cylindrical geophone assembly, but are not sensitive to vibrations perpendicular to the axis of the geophone. As mentioned above in land surveys, geophones are usually "planted" on the ground with this axis vertical.

In addition to the geophones 22, 24 and 26, the sensor unit of FIG. 2 includes a component mounting member 27, and input cable 28 normally including fifty or more conductor pairs. An inner rubber sheath 30 is provided to enclose the conductors and the geophones, and at least one and sometimes two stranded stainless steel cables 32 are included to take up the substantial longitudinal stress which must be sustained by the seismic cable as it is towed or reeled up. The sensor units and cable assembly may be enclosed in suitable expanded or cellular plastic 34 such as polyethylene, or other high strength plastic, which provides the external sheath for the seismic cable.

Associated with each of the geophones 22, 24 and 26 which may be bipolar, are gravity switch arrangements such as mercury switches 42, 44 and 46 which serve to reverse the polarity of signals from the individual geophones when they are rotated by about 180°. An additional gravity switch 48 is employed to select or to enable one of the three differently oriented geophones 22, 24 and 26, as will be described in greater detail in connection with FIG. 4.

FIG. 3 is a cross-sectional view taken along lines 3—3 of FIG. 2 and shows the geophones 22 and 24, mercury switch 42, the stranded stainless steel cables 32, the rubber sheath 30 and the cellular plastic outer covering or sheath 34 of the seismic cable. In addition the cross section of FIG. 3 shows a number of groups of conductor pairs 50 within the rubber sheath 30. In this regard it may be noted that the cable pairs 28 which are grouped together in the sections 20 of the seismic cable between the sensor units, are separated within the sensor unit 18 for convenience in routing them by the geophones.

Incidentally, the space 52 around the geophones 22, 24 and 26 may be filled with a suitable waterproof insulating fluid or viscous material such as silicone grease which will not react with or short circuit any of the components within each sensor unit 18. When such fluid is used, care must be taken to prevent the fluid from entering the geophone cases and interfering with the free motion of the bobbin.

Concerning the mode of operation of the mercury switches 42, 44 and 46, and the additional mercury switch 48, reference is made to FIG. 4. In FIG. 4 the geophone 22 is shown in the vertical position. The function of the mercury switches is to select the particular one of the bipolar geophones 22, 24 and 26 which is in the most nearly vertical position to reverse the connections from each geophone in the event that the orientation of the geophone is shifted about the cable axis by approximately 180°. In FIG. 4 the output leads 54, 56 to the seismic cable are connected to the geophone 22 through the six-position mercury switch 48 and the two-position mercury switch 42. More specifically note that the pool of mercury 58 is interconnecting contacts 60, 62 associated with the circular mercury switch 48, and thus the lower lead 56 is shown connected through contacts 60 and 62 to the lower input lead 64 of the geophone 22. The upper lead 66 of the geophone is connected through the pool of mercury 68 and lead 70 to the upper output lead 54.

It may, of course, be readily appreciated that the output leads 64 and 66 would be connected respectively to leads 54 and 56, thus reversing the output polarity, when the entire assembly is turned upside-down, or rotated about the axis of the seismic cable by 180°. Of course, in such reversal the contacts 72 opposite contacts 60 and 62, and the contacts 74 of switch 42, opposite contacts 76, will become operative.

The other two geophones 24, 26 have their axes oriented at 60° with respect to each other and with respect to geophone 22, and are aligned, respectively, with the remaining pairs of opposed contacts of the mercury switch 48. More specifically geophones 24 and 26 both have circuit arrangements corresponding to that of geophone 22. As shown in FIG. 4 in greater detail, their associated mercury switches 44 and 46 have output terminals 78 and 80 of mercury switch 48, while the other output lead of geophone 26 is connected to terminals 82 and 84 of mercury switch 48. With this arrangement only one of the three bipolar geophones is energized at any one time, and this is the one which is most nearly vertical. In addition, as the orientation of the geophones is reversed, the output polarity is reversed in accordance with known practice in the seismic field.

In the foregoing paragraphs, the electrical connections of FIG. 4 from one set of geophones 18 to leads 54 and 56, which make up one cable pair included in signal cable 28 of FIG. 2, have been described. In accordance with known practice in the seismic field, signals from adjacent geophones constituting a geophone array, may be connected in parallel. In FIG. 4, such an arrangement is indicated by the geophone assembly 18' which is shown connected to conductor pair 54, 56 in parallel with geophone assembly 18.

FIG. 5 shows an alternative embodiment of the invention including six unipolar geophones 91 through 96 having self-contained gravity switches mounted at 60 degree intervals around the axis of the cable sensor unit 18. Each geophone is actuated by its associated gravity switch at an angle of between ±30° and ±45° from its lower vertical position, so at least one geophone is always connected to the output cable with the proper polarity. It is further noted that in cases where two geophones are both connected in parallel to the output cable pair, there is very little change in the resultant signal, as compared to that from a single geophone.

A single central stranded steel cable serves as the cable stress member. It is convered by a thin inner insulating sheath 100. The seismic cable conductor pairs 102 surround the stress member 98, and are in turn protected by a rubber sheath 104. The miniature geophones are mounted in openings in an insulating tube 106 and are located peripherally around the cable. Electrically, they are connected in parallel through their individual gravity switches to a single one of the cable pairs 102.

The space 108 around the geophone units may, as in the case of the embodiment of FIGS. 2 through 4, be filled with a suitable insulating fluid or viscous material such as silicone grease. The unit 18 is protected by the high strength outer sheath 34, which may be formed of cellular polyethylene.

In closing, it may be noted that, instead of mercury switches, other gravity operated switches could be employed in the implementation of the invention. Further, in addition to electrical disabling of nonvertical geophones, mechanical disabling could be employed, with all three geophones remaining in electrical communication with the output leads. Also, instead of the three bipolar geophones or the six unipolar geophones disclosed with regard to specific embodiments of the invention, greater or lesser numbers of geophones may be used. Other similar changes within the scope of those skilled in the art are considered to be within the purview of this invention.

What is claimed is:

1. A geophysical cable assembly comprising:
   a seismic cable, having a longitudinal axis, disposed, in operation, substantially horizontally along the surface of the earth;
   a plurality of sets of geophones located at predetermined intervals along said cable, each said set including at least three geophones having their axes of maximum sensitivity directed along at least three angles of orientation around the longitudinal axis of the cable; and
   multicontact, gravity coupled switch means interconnected with each said set of geophones for selectively enabling the geophone whose axis of maximum sensitivity is directionally oriented to receive vertically incident seismic signals.

2. A geophysical cable assembly as defined in claim 1 wherein said three geophones are bipolar.

3. A geophone cable assembly as defined in claim 2 wherein an additional gravity coupled switch means is associated with each said set of geophones for reversing the polarity of the output from said enabled geophone when it is rotated about the cable axis by approximately 180°.

4. The seismic cable assembly as defined in claim 1 wherein said seismic cable includes a plurality of conductor pairs and wherein:
   said plurality of sets of geophones are grouped into a subplurality of geophone arrays, each said geophone array including as some of its members at least two of said sets of geophones; and
   means for interconnecting the selectively enabled geophones from each said geophone set included in said geophone array.

5. A seismic cable assembly comprising:
   a seismic cable in substantial operative contact with the surface of the ground;
   a set of at least two closely spaced directional detectors connected to said cable, said detectors being located at different angular orientations mutually perpendicular to the longitudinal axis of said cable; and
   gravity switching means for connecting a selected one of said directional detectors having the most nearly vertical orientation to said seismic cable with a polarity depending upon the orientation of said selected directional detector.

6. The seismic cable assembly as defined in claim 5 wherein said longitudinal axis of said seismic cable is substantially horizontally disposed.

7. A seismic cable assembly having a longitudinal axis substanitally horizontally disposed in operative contact with the earth's surface and including a plurality of sets of geophones, each said set including at least two members, the direction of maximum sensitivity of each member of said set of geophones differing from one another, and all of said directions being substantially perpendicular to said longitudinal axis; and
   each member of any one set of geophones is provided with a connection to the same electrical circuit.

8. The seismic cable assembly defined in claim 7 including means for making at least one of the connections for the member of said set whose axis of maximum sensitivity is most nearly oriented with the vertical and means for breaking those connections for the other members of said set.

* * * * *